United States Patent [19]
Ashton

[11] 3,915,532
[45] Oct. 28, 1975

[54] STORAGE AND SERVING CONTAINER

[75] Inventor: Harold P. Ashton, Providence, R.I.

[73] Assignee: Dart Industries Inc., Los Angeles, Calif.

[22] Filed: Feb. 26, 1975

[21] Appl. No.: 553,377

[52] U.S. Cl. .................. 312/351; 150/.5; 220/17; 426/124
[51] Int. Cl.[2] ........................................ B65D 25/02
[58] Field of Search .......... 312/351; 220/17; 150/.5; 429/109, 112, 115, 124, 129

[56] References Cited
UNITED STATES PATENTS

| | | | |
|---|---|---|---|
| 2,318,842 | 5/1943 | Eaton | 220/17 X |
| 2,822,640 | 2/1958 | Fuller | 312/351 |
| 3,451,328 | 6/1969 | Swett | 150/.5 |
| 3,698,783 | 10/1972 | Swett | 312/351 |
| 3,756,681 | 9/1973 | Croston | 312/351 |
| 3,825,049 | 7/1974 | Swett | 150/.5 |

*Primary Examiner*—Donald F. Norton

[57] ABSTRACT

A storage and serving container for fish or vegetables that necessitate the use of a medium to heat or cool same during service and which further comprises a container adapted to be sealed to prevent ingress or egress of moisture. The container has a supporting tray particularly adapted to position the contained product or produce above the container bottom so that such is positioned out of contact with any fluid of the mentioned medium. The supporting tray is also reversibly positionable in the container so that for or during service of the contained product, such will be supported in but above the container thus affording the user easy access thereto.

5 Claims, 6 Drawing Figures

U.S. Patent  Oct. 28, 1975  3,915,532
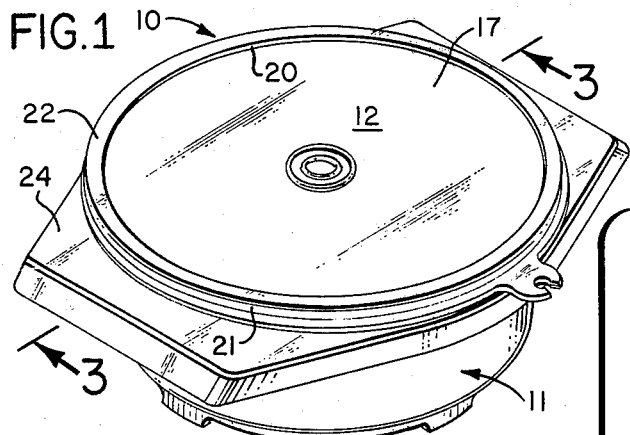
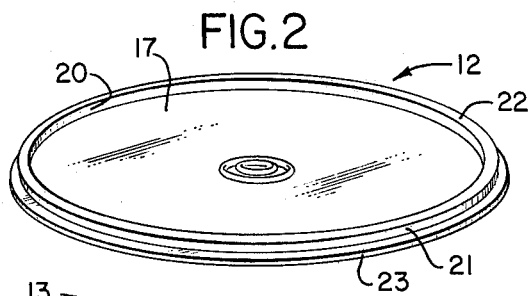
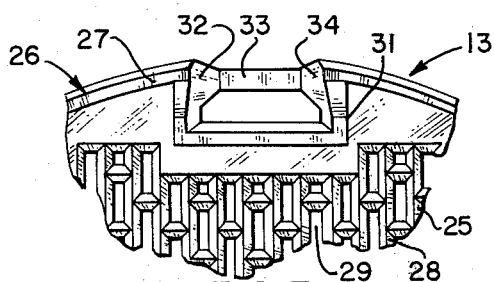
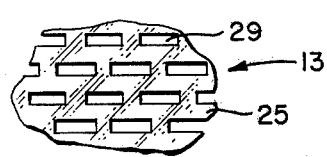
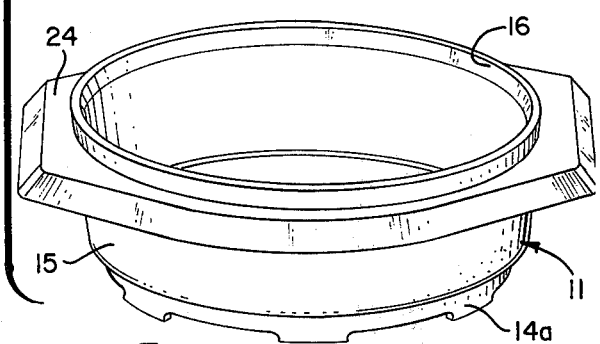
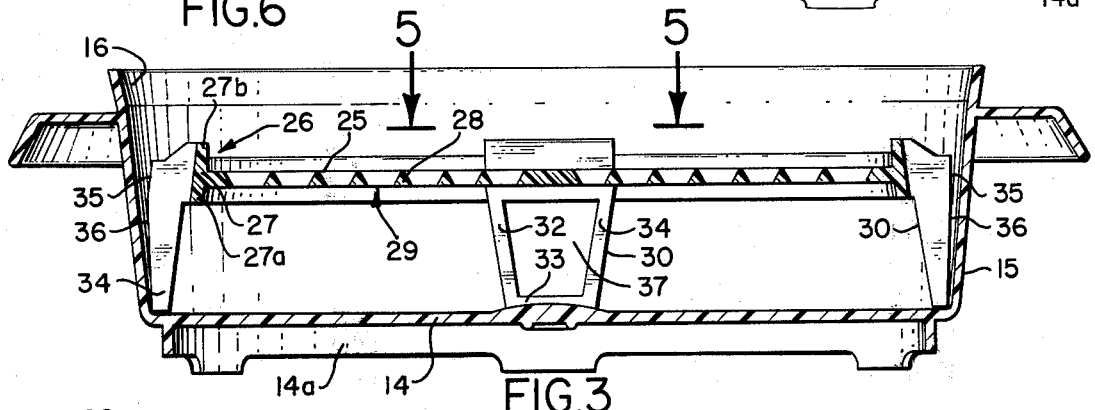
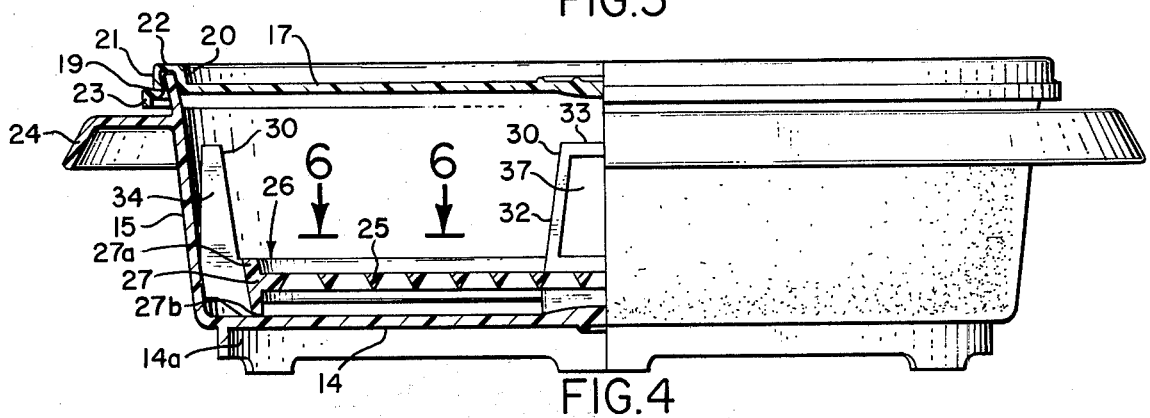

STORAGE AND SERVING CONTAINER

This invention generally relates to a plastic foodstuff container and more particularly to a container assembly adapted for the preparation and storage of fish or vegetables or the like.

It is known that various foodstuffs such as certain hors d'oeuvre and the like are more appetizing and present a more desirable appearance when maintained evenly moist and chilled or warmed condition.

It is therefore an object of the present invention to provide means by which such foodstuufs may be conveniently stored and thereafter displayed and served in conjunction with and from the same container. It has been found that a container capable of being hermetically sealed and which has been provided with a suitable dual positionable support means for the foodstuffs is easily convertible from storage to serving service. Thus, fish or shrimp, for example, may be prepared and supported within a chilled moist and hermetically controlled area and be maintained out of direct contact with the chilling medium which may collect in the bottom of the container, and accordingly be so stored and served under those conditions found to be most favorable for its preservation.

With the above and other objects in view that will hereinafter appear, the nature of the invention will be more clearly understood by reference to the following detailed description, the appended claims and the several views illustrated in the accompanying drawings. In the Drawings:

FIG. 1 is a top perspective view of the container of the present invention with its closure in place;

FIG. 2 is an exploded top perspective view of the container shown in FIG. 1;

FIG. 3 is a cross-sectional view of the container taken along line 3—3 of FIG. 1 but with the closure removed and the supporting tray positioned for display and service;

FIG. 4 is a partial cross sectional side elevational view of the container taken along line 3—3 of FIG. 1;

FIG. 5 is a partial top plan view of the supporting tray as seen along line 5—5 in FIG. 3; and FIG. 6 is a partial bottom plan view of the supporting tray as seen along line 6—6 in FIG. 4.

In the drawings, the component portions of the container means 10 are a receptacle 11, a closure 12 therefor, and a tray or support 13. The container 11 is generally formed with a substantially flat base 14 having peripheral and integral side walls 15 upstanding therefrom. Such side walls 15 terminate in an open upper end defined by upper terminal edge portion 16.

The closure 12 is comprised of a top wall portion 17, the periphery of which is provided with an inverted groove 19 for receipt of the terminal edge portion 16 of the container. Such inverted groove 19 (FIG. 3) is comprised of an inner wall 20, and outer wall 21 and a connecting wall 22. The cover seal may be further provided with a horizontally extending lip 23 dependent from the outer wall 21. A combination stiffening and handle flange 24 is positioned slightly below the upper terminal portion of the container and a vertically extending base rim 14a is provided to elevate the base 14 from the supporting surface for the container means 10. As is apparent in all of the drawings, the support 13 is comprised primarily of a grid-like supporting surface 25 and a peripheral lip 26, comprised of upstanding means 27 including wall portions 27a and 27b. The surface 25 further includes a plurality of interconnected triangularly shaped ribs 28 between which are openings 29. This surface, because of means 27 which act as supports, is elevated above the container base or bottom 14. Thus, any cooling or heating medium can be placed in the container under the tray 13 and out of contact with the food placed thereon. Furthermore, in the event the foodstuff is for example, served on ice that is also placed on the tray, as it melts this water will drain into the space 28 provided below the supporting surface 25.

As indicated, the ribs 28 are triangularly shaped and the apexes thereof are directed upwardly. This then minimizes the area of contact between the contained vegetables and the tray 13 and so presents the maximum of vegetable surface to the moist atmosphere which is so desirable in obtaining the crisp characteristics of such produce. Likewise, the tray 13 is constructed for reversible placement within the container. Accordingly, the wall portions 27a and 27b are intended to be such that supporting surface 25 is elevated well above container base 14 in one position (FIG. 3). And in the storage position (FIG. 4) the underside of surface 25 faces upwardly while the top side thereof is in close proximity to base 14.

In the particular embodiment depicted by the drawing the mentioned wall portion 27a includes a plurality of leg-like members 30 appropriately positioned around the tray periphery. These members are recessed into the surface 25 as at 31 and are formed by the interconnected panel portions 32, 33 and 34. Such are, of course, intended to provide for the elevation of tray 13 to a position within the receptacle 11 such that the supported foodstuff is well exposed above the container for display thereof and easy removal by the user. Note that the edges 35 and 36 of panel portions 32 and 34 are tapered slightly similarly to container walls 15 to accommodate the placement of portion 33 and wall portion 27b on container base (FIGS. 3 and 4).

Likewise, the panel portions 32-34 because of recessed relationship with the tray surface 25 and channel opening 37 produced thereby, form ideal handles that enable the user to easily position and/or remove the tray 13 in or from the receptacle 11. This particular arrangement therefore permits such removal without emptying the contents of the container and without inverting the container. Thus, excess collections of water or other liquids can be easily disposed of or water may be easily added to the container without unduly disturbing the contents thereof.

It should, however, be appreciated that the peripheral lip 26 of the tray 13 may be constructed differently and yet accomplish the same desired result, i.e. tray reversibility to different heights above the container base.

It should further be pointed out that the preferred embodiment of the container closure and tray herein described are manufactures of plastic materials. Likewise, the container and tray are generally made of high and low density polyethylene blends or of polypropylene while the closure is preferably made of a low density polyethylene material. However, other materials may be employed with equally good results.

It will be apparent from the foregoing description that novel and advantageous provisions have been made for carrying out the desired objects of the invention. However, attention is directed to the fact that variations other than those above disclosed may be made in the example form of the invention disclosed herein without departing from the spirit and scope thereof as defined in the appended claims.

I claim:

1. A food storage device for perishables and including a container having a base with peripheral side walls extending upwardly therefrom a removable foodstuff supporting tray, a substantial portion of which incorporates a plurality of interconnected triangularly shaped ribs integral with and interspersed between a peripheral lip that contacts the side walls and the base of the container, said peripheral lip of said tray including at least two upstanding means each adapted to abut the container base and side walls, one of said means being of greater extent than the other, and a sealing cover for said container and including peripheral sealing means in contact with the free terminal peripheral portions of said side walls so as to hermetically seal said container.

2. A food storage device according to claim 1 wherein said upstanding means are peripheral wall portions extending approximately perpendicularly from the plane formed by said ribs.

3. A food storage device according to claim 1 wherein one of said means is a plurality of legs spaced around said peripheral lip.

4. A food storage device according to claim 3 wherein said legs are recessed with respect to said peripheral lip whereby a channel is generated thereby.

5. A food storage device according to claim 4 wherein each of said legs include three interconnected panel portions.

* * * * *